United States Patent Office 3,637,908
Patented Jan. 25, 1972

3,637,908
PRODUCTION OF POLYACRYLONITRILE FILAMENTS
Heinz Pohlemann, Limburgerhof, Rolf Wurmb, Heidelberg, Joachim Kunde, Frankenthal, and Bernd Stanger, Ludwigshafen, Germany, assignors to Badische Anilin- & Soda-Fabrik Aktiengesellschaft, Ludwigshafen (Rhine), Germany
No Drawing. Filed July 9, 1969, Ser. No. 840,515
Claims priority, application Germany, July 9, 1968, P 17 69 762.0
Int. Cl. C08g 41/04
U.S. Cl. 260—857 R                     4 Claims

ABSTRACT OF THE DISCLOSURE

Production of antistatic filaments, threads or fibers based on acrylonitrile polymers by spinning solutions of these polymers in organic solvents, the solutions containing oxyalkylated synthetic linear polyamides.

---

This invention relates to a process for the production of antistatic filaments, threads or fibers by spinning solutions of acrylonitrile polymers in organic solvents.

The problem of static electrification of the surfaces of acrylonitrile polymers is well known. There has been no lack of attempts to reduce static by adding substances which decrease surface resistance. Shaped articles, such as filaments, threads or fibers, are usually treated with solutions of the said substances. Such a treatment has the disadvantage however that the substance applied to the filaments, threads or fibers is removed again in laundering. Stringent requirements are placed on antistatic compounds which are to be incorporated into the polymers. They have to be capable of fine dispersion in the acrylonitrile polymer and should not impair the mechanical properties of the articles, for example filaments. Moreover, they should not exude to the surface to too great an extent and cause undesirable effects thereon. Furthermore the solubility in water of such substances should not be too high because otherwise they will be washed out from the articles in the course of time. Polymers which come into contact with the human skin should only contain antistatic agents which are compatible with the skin. Prior art antistatic agents do not satisfy the said requirements in every respect. Embrittlement, discoloration or unpleasant odor are also often observed in the case of polymers which have been made antistatic.

It is an object of this invention to provide a process for the production of filaments, threads and fibers which are more or less permanently antistatic. This and other objects which will become apparent in the following description are achieved by the invention.

In accordance with this invention a process for the production of antistatic filaments, threads or fibers based on polymers containing at least 85% by weight of polymerized units of acrylonitrile comprises spinning a solution of the polymer in an organic solvent, the solution which is spun being a solution of a polymer containing at least 85% by weight of polymerized units of acrylonitrile and also an oxyalkylated synthetic linear polyamide.

Polyamides in the present specification are always synthetic linear polyamides having recurring carbamoyl groups in the main chain.

The amount of oxyalkylated polyamide used according to this invention is advantageously from 1 to 10%, particularly from 2 to 6%, by weight with reference to the acrylonitrile polymer. The oxyalkylated polyamides used according to the invention may be prepared by known methods, for example by reaction of 1,2-alkylene oxides such as ethylene oxide and/or 1,2-propylene oxide with polyamides under superatmospheric pressure at elevated temperature if desired in a solvent and in the presence or absence of a solubilizer. The weight ratio of polyamide to alkylene oxide is advantageously from 1:0.5 to 1:5, preferably from 1:1 to 1:4.

Synthetic polyamides having recurring carbamoyl units in the main chain are suitable polyamides from which the oxyalkylated polyamides used as antistatic agents can be prepared. Examples are polycondensates prepared by conventional methods from: lactams such as caprolactam, caryllactam, laurolactam or mixtures of lactams; salts of the diamine/dicarboxylic acid type such as the salts of adipic acid, suberic acid or sebacic acid and hexamethylenediamine, octamethylenediamine or dodecamethylenediamine or copolyamides of the said polyamide-forming starting materials. Mixtures of polyamides are also very suitable. The K values of the polyamides used are generally more than 10 (determined according to the method of H. Fikentscher, Cellulosechemic, 13, 58, (1932)).

It has proved to be advantageous first to prepare a solution of the oxyalkylated polyamide, if necessary while heating to from 60° to 100° C., and then to dissolve the acrylonitrile polymer therein. Suitable solvents include the organic solvents conventionally used for acrylonitrile polymers, for example dimethylformamide, dimethylacetamide, dimethylsulfoxide or ethylene carbonate. It may be advantageous to unite a solution of an oxyalkylated polyamide with a solution of the acrylonitrile polymer, the same solvent preferably being chosen. This is especially the case when the acrylonitrile polymer has been prepared by solution polymerization and is already present in dissolved form. It is advantageous to use so much solvent for the oxyalkylated polyamide and acrylonitrile polymer that finally from 20 to 30% by weight solutions of the acrylonitrile polymer are obtained, if necessary after concentration.

It is particularly favorable for the solutions of acrylonitrile polymer and/or of the oxyalkylated polyamide, particularly in dimethylformamide, to contain soluble lithium compounds such as lithium chloride or lithium sulfate. Surprisingly these solutions have a lesser tendency to gel formation and can therefore be stored for longer periods. It is advantageous for the oxyalkylated polyamides to be dissolved in the said solvents in the presence of the lithium compounds because dissolution is thus considerable accelerated. It is however also favorable to add the lithium compounds to solutions of oxyalkylated polyamides so that their tendency to gel formation is clearly decreased. Finally it is possible to add the lithium compound to the finished solutions of acrylonitrile polymers and oxyalkylated polyamides.

The amount of lithium compound is advantageously from 0.1 to 5%, particularly from 0.2 to 2%, by weight with reference to the amount of solvent used for dissolving the oxyalkylated polyamide and the acrylonitrile polymer.

The acrylonitrile polymers according to the invention may be prepared by conventional methods, for example by precipitation or solution polymerization. Homopolymers and also copolymers of acrylonitrile which have been prepared using up to 15% by weight of conventional comonomers may be given an antistatic finish. Examples of suitable comonomers are olefinically $\alpha,\beta$-unsaturated monocarboxylic acids such as acrylic acid, methacrylic acid or crotonic acid, or esters thereof with monohydroxyl compounds having from one to eighteen carbon atoms such as methyl acrylate, butyl acrylate or methyl methacrylate, and also vinyl compounds such as vinyl acetate, vinyl chloride or styrene, unsaturated sulfonic acids such as vinylsulfonic acid, allylsulfonic acid or styrenesulfonic acid, or unsaturated basic compounds such as vinylpyridines or 2-diethylaminoethyl acrylate.

The solutions of acrylonitrile polymers and the oxyalkylated polyamides according to this invention are processed into filaments, threads or fibers by usual methods, for example by wet or dry spinning, followed if desired by a conventional aftertreatment such as stretching. The oxyalkylated polyamides are in the form of fine particles in a separate phase uniformly dispersed in the filaments.

A particularly advantageous method consists in uniting a solution of an acrylonitrile polymer obtained by solution polymerization with a solution of the oxyalkylated polyamide and spinning the resultant solution.

Conventional additives such as stabilizers, brighteners, pigments or dyes may be added to the acrylonitrile polymer solutions prior to spinning.

Filaments, threads and fibers of acrylonitrile polymers which have been made antistatic according to this invention exhibit excellent resistance to static electrification. This is true even of freshly spun filaments so that further processing is greatly facilitated. Cloth which has been made for example from acrylonitrile polymers made antistatic in accordance with this invention exhibits consistantly low static even after having been washed several times. The degree of whiteness of the articles is not in any way impaired by the oxyalkylated polyamides.

The invention is illustrated by the following example. The parts and percentages specified in the example are by weight.

EXAMPLE (a) Production of an oxyalkylated polyamide 90 parts of a polycaprolactam having a K value of 66 and 10 parts of a polyhexamethylene adipamide having a K value of 67 are mixed by common melting. After cooling, 10 parts of the polyamide mixture is reacted at from 80° to 100° C. and a pressure of from 5 to 10 atmospheres gauge with ethylene oxide until 40 parts of ethylene oxide has reacted with the polyamide mixture. The pressure is then released and the product is rinsed with water.

(b) Production of the antistatic filaments 25 parts of the oxyalkylated polyamide prepared under (a) is dissolved in 1500 parts of dimethylformamide which contains 7.5 parts of anhydrous lithium chloride during four hours at from 80° to 90° C. 475 parts of a precipitation polymer of 94% of acrylonitrile, 5% of methyl acrylate and 1% of allylsulfonic acid is dissolved in the said solution. The resultant solution is spun into threads in a dry spinning unit and the threads are stretched. The threads have a static electrification of 0 volt initially; this rises to 50 volts after ten washings and then does not change even after twenty-five washings. The chargability of threads prepared from an equivalent polyamide but without the addition of the oxyalkylated polyamide is from 1000 to 1200 volts.

What we claim is:

1. In a process for the production of filaments, threads or fibers of a polymer containing at least 85% by weight of polymerized units of acrylonitrile by spinning a solution of said acrylonitrile polymer in an organic solvent, the improvement for imparting antistatic properties to the spun product which comprises spinning a solution which contains, in addition to said acrylonitrile polymer, an oxyalkylated synthetic polyamide obtained by reaction of a 1,2-alkylene oxide with the nitrogen atoms of a synthetic polyamide having recurring carbonamide groups in the linear polymeric chain, the amount of oxyalkylated polyamide being from 1 to 10% by weight with reference to said acrylonitrile polymer.

2. A process as claimed in claim 1 wherein the amount of said oxyalkylated polyamide is from 2 to 6% by weight with reference to the acrylonitrile polymer.

3. A process as claimed in claim 1 wherein said solution additionally contains a soluble lithium compound in an amount of from 0.1 to 5% by weight with reference to the amount of organic solvent.

4. A process as claimed in claim 3 wherein the amount of said soluble lithium compound is from 0.2 to 2% by weight with reference to the amount of organic solvent.

References Cited

UNITED STATES PATENTS

| 2,404,714 | 11/1944 | Latham | 260—857 |
| 2,632,748 | 3/1953 | Caldwell | 260—857 |
| 2,688,008 | 8/1954 | Chaney | 260—857 |
| 3,033,813 | 5/1962 | Werner | 260—857 |
| 3,038,885 | 6/1962 | Best | 260—857 |
| 3,384,681 | 5/1968 | Kobayashi | 260—857 |

FOREIGN PATENTS

| 748,485 | 12/1966 | Canada | 260—857 |

PAUL LIEBERMAN, Primary Examiner

U.S. Cl. X.R.

260—78 R, 78 SC